UNITED STATES PATENT OFFICE.

GEORGE NIMMO, OF JERSEY CITY, NEW JERSEY.

IMPROVED COMPOSITION FOR CASTINGS.

Specification forming part of Letters Patent No. 48,973, dated July 25, 1865.

*To all whom it may concern:*

Be it known that I, GEORGE NIMMO, of Jersey City, in the county of Hudson and State of New Jersey, have invented, made, and applied to use a certain new and useful Improvement in Compound Metallic Castings; and I do hereby declare the following to be a full, clear, and exact description of my said invention and of the mode of applying the same to use.

Alloys have heretofore been extensively produced and in a great variety by fusing together different metals. There are, however, many metals and scrap-pieces that are not adapted for use in alloys—such, for instance, as iron and steel shavings, borings, turnings, &c. I have discovered that these may be made use of for producing a compound metal of great beauty and possessing considerable strength, the same being particularly adapted for shafts, columns, machine-frames, &c. The material employed is molten copper, brass, or any suitable alloy, which I use for brazing together pieces of iron or other cheap metal, such as boiler-makers' pinchings, shavings of wrought or cast iron, or steel chips, filings, pieces, or scraps. I take these and subject them to a high degree of heat, so that they are almost at a welding temperature. I then turn them into a mold, prepared, as usual, in sand or otherwise, of the shape of the article to be produced, and immediately pour upon such heated pieces of iron or other metal brass or copper in a molten state, the effect of which is to braze the said pieces of baser metal together and form one solid mass, that may be turned, planed, ground, polished, or otherwise worked or finished, and the mottled appearance of this compound metal is such as to produce great beauty and render the same particularly adapted to ornamental columns, shafts, wheels, frames, &c., where a homogeneous metal is not indispensable. I therefore intend to employ this compound metal wherever the same is available, and it will be apparent that it is much cheaper than articles made of brass or copper alone.

What I claim, and desire to secure by Letters Patent, is—

The compound metal formed in the manner specified.

Dated June 13, A. D. 1865.

GEORGE NIMMO.

Witnesses:
 LEMUEL W. SERRELL,
 CHAS. H. SMITH.